April 5, 1938. C. G. EISENBERG, JR 2,113,044
HOISTING MECHANISM
Filed April 28, 1937   3 Sheets-Sheet 1

INVENTOR.
C. G. Eisenberg, Jr.
BY Morsell, Lieber & Morsell
ATTORNEYS.

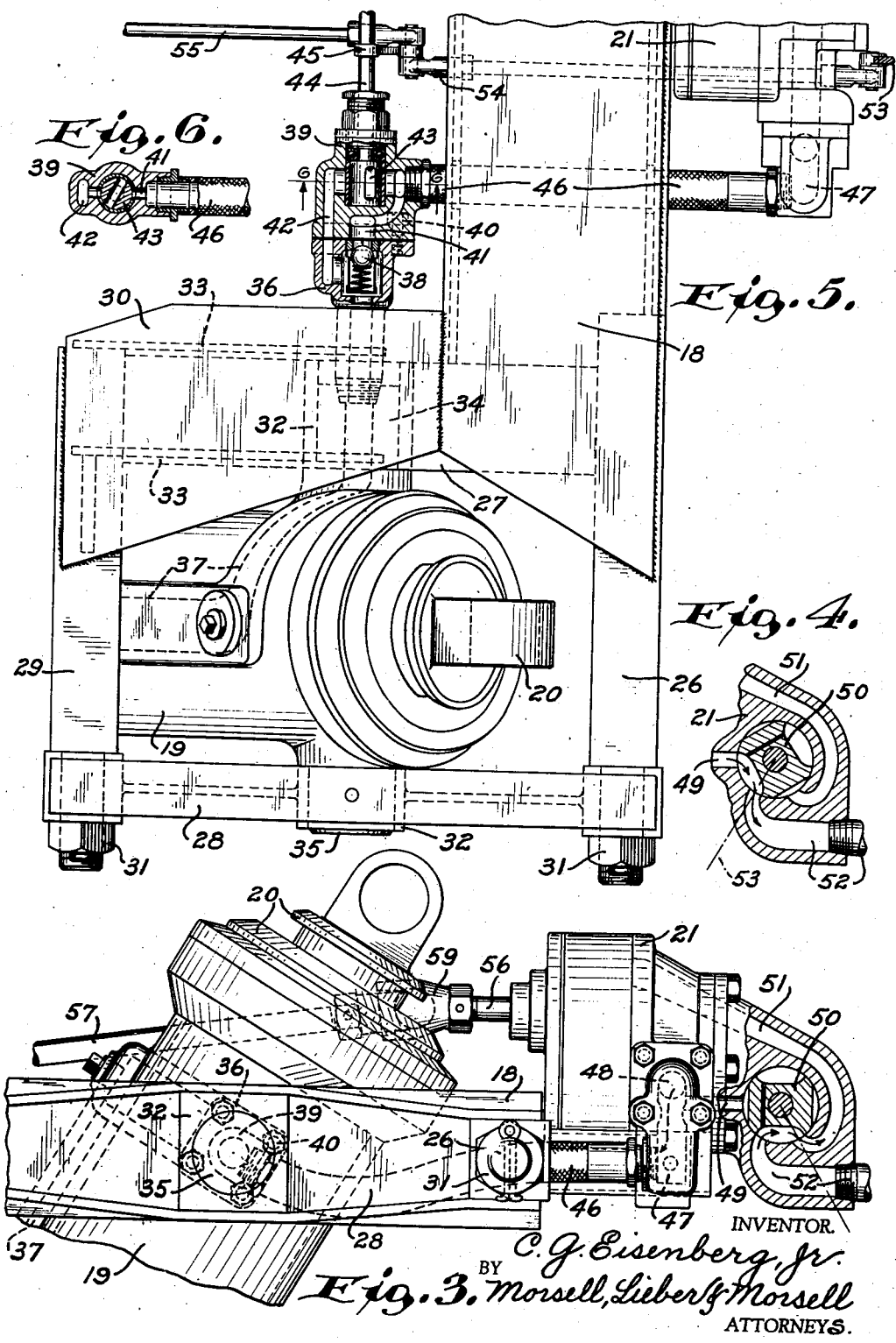

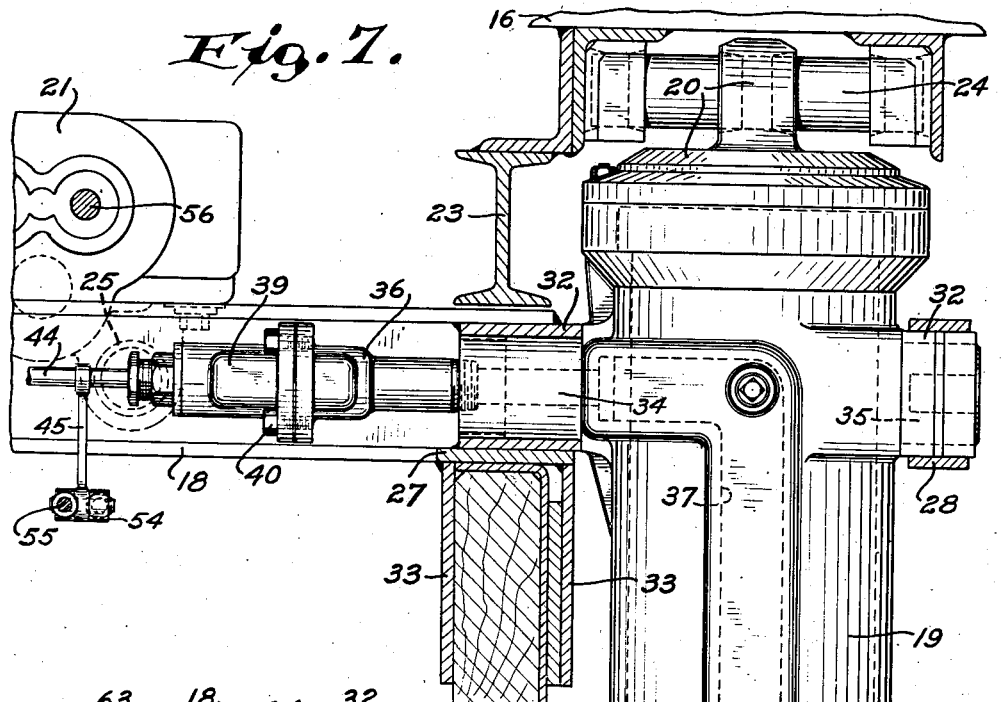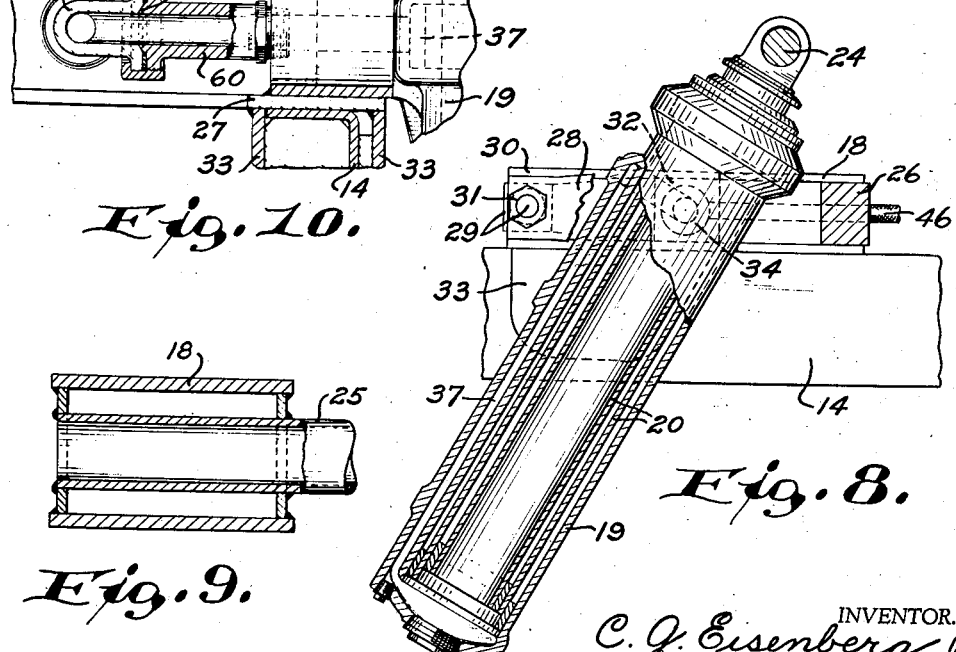

Patented Apr. 5, 1938

2,113,044

UNITED STATES PATENT OFFICE 2,113,044

HOISTING MECHANISM

Charles G. Eisenberg, Jr., Wauwatosa, Wis., assignor to The Heil Co., Milwaukee, Wis., a corporation of Wisconsin Application April 28, 1937, Serial No. 139,476

4 Claims. (Cl. 298—22)

My present invention relates generally to improvements in the art of controllably lifting and lowering relatively bulky and heavy objects, and relates more specifically to improvements in the construction and operation of fluid pressure actuated hoisting mechanism for effecting dumping of the load carrying body of a dump truck or the like.

Generally defined, an object of the present invention is to provide improved fluid pressure actuated hoisting mechanism for tiltable load carrying bodies or the like, which is simple, compact and durable in construction, and which is moreover highly efficient in operation.

It is common commercial practice in the art of transporting materials in bulk with the aid of motor trucks, to utilize tiltable load carrying bodies which are adapted to be dumped by means of hydraulic hoists. The dump body is ordinarily pivotally attached at its rear end to the rear of the truck chassis, and the hoists of which there may be one or more, usually have their cylinders pivotally suspended from the chassis beneath the front of the body and are provided with piston rods pivotally attached directly to the bottom of the body forwardly of the rear body suspension pivot. In large capacity dump trucks, the bodies are frequently of relatively great size and extend considerable distances laterally beyond each side of the chassis, and it then becomes desirable to provide two simultaneously operable hoists located one on each outer side of the truck chassis in front of the rear driving wheels. Due to the fact that these hoists are often required to lift extremely heavy loads, the cooperating hoists which deliver the lifting force against the bodies at varying angles, must be rigidly supported so as to prevent relative displacement or misalinement of the several hoists due to unequal load distribution on the body or possible weaving or other distortion of the truck chassis. The hoist supports must also avoid interfering with the truck driving mechanism; and since it is preferable to utilize a hoist actuating pump which is preferably located near the hoists and driven from the truck propelling motor, the hoist suspension structure must also be as compact as possible so as to make room for the pump and the liquid supply reservoir. All of these requirements tend to introduce many difficult problems in the construction of such dual outside mounted hydraulic hoisting systems.

It is therefore a more specific object of my present invention to provide an improved fluid pressure actuated hoist system embodying outside mounted trunnion supported dual hoists which are rigidly interconnected and mounted so as to meet all of the above mentioned requirements.

Another specific object of the present invention is the provision of a dual hoist assemblage especially adapted for cooperation with a dump body tiltably suspended from a vehicle chassis, which is effectively operable regardless of unequal load distribution and of possible distortion of the chassis frame.

A further specific object of my invention is the provision of a trunnion supported twin hoist having improved distribution and control mechanism for delivering actuating fluid to and from the hoist cylinders at all times, without danger of leakage.

Still another specific object of the invention is to provide an improved mounting for a plurality of simultaneously operable hydraulic hoists, wherein the cylinders of the hoists are overhung with respect to a central support and are subjected to variable forces tending to throw the same out of true alinement during normal operation.

An additional specific object of my invention is to provide a new and useful twin hoist assemblage which is adapted to be mounted as a unit upon the chassis of a truck, so that the hoists and the supports therefor will cause minimum obstruction and interference with the driving and other mechanisms forming part of the truck assemblage.

These and other specific objects and advantages will be apparent from the following detailed description.

A clear conception of embodiments of the several features constituting the present invention, and of the mode of constructing and of operating hoisting mechanisms built in accordance with the improvement, may be had by referring to the drawings accompanying and forming a part of this specification wherein like reference characters designate the same or similar parts in the various views.

Fig. 3 is an enlarged fragmentary side view of the upper portion of one of the hoists and of the pump for delivering fluid thereto, the control valve for the pump being shown in section;

Fig. 4 is a similarly enlarged section through the pump control valve of Fig. 3, showing the valve in hoist lowering position;

Fig. 5 is a part sectional top view of the assemblage of Fig. 3, showing one of the hoists and a part of the pump, and having the fluid control valves thereof shown in section;

Fig. 6 is a transverse vertical section through one of the fluid return valves, the section being taken along the line 6—6 of Fig. 5;

Fig. 7 is a fragmentary transverse vertical section through one side of the chassis and dump body, showing a front view of fragments of one of the hoists and of the pump;

Fig. 8 is a central vertical section of one type of hoist such as may be utilized in my present improved system;

Fig. 9 is a transverse vertical section through the hoist supporting beam, the section being taken through one of the pump supports; and Fig. 10 is a front view of a modified type of connection for conducting fluid to and from one of the hoists through the trunnion thereof.

While I have illustrated my invention herein as being specifically embodied in a twin telescopic hydraulic hoisting system for an end dump body associated with a motor driven truck, it is not my intention to thereby unnecessarily restrict the scope, since some of the features are obviously more generally applicable to other types of fluid pressure actuated hoisting systems utilizing other kinds of hoist assemblages.

Figure 2:
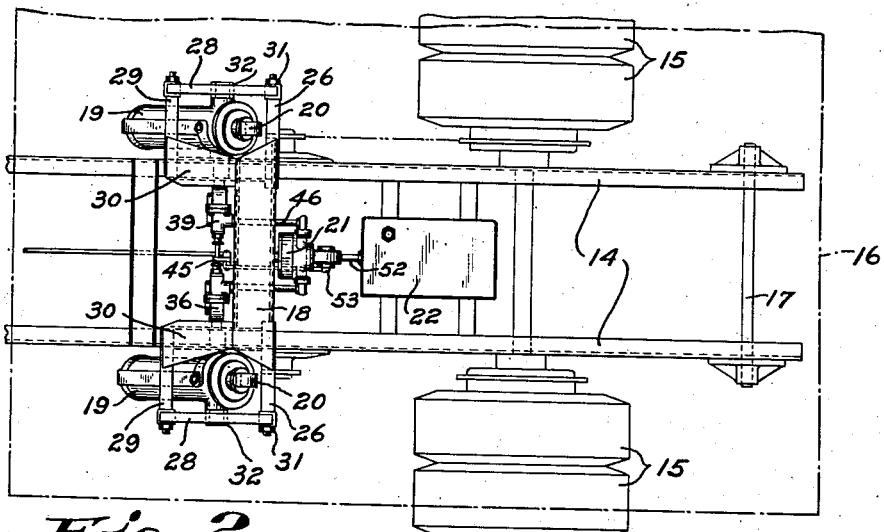
Fig. 2 is a top view of the assemblage of Fig. 1, showing the outline of the dump body in dot-and-dash lines.
Figure 1:
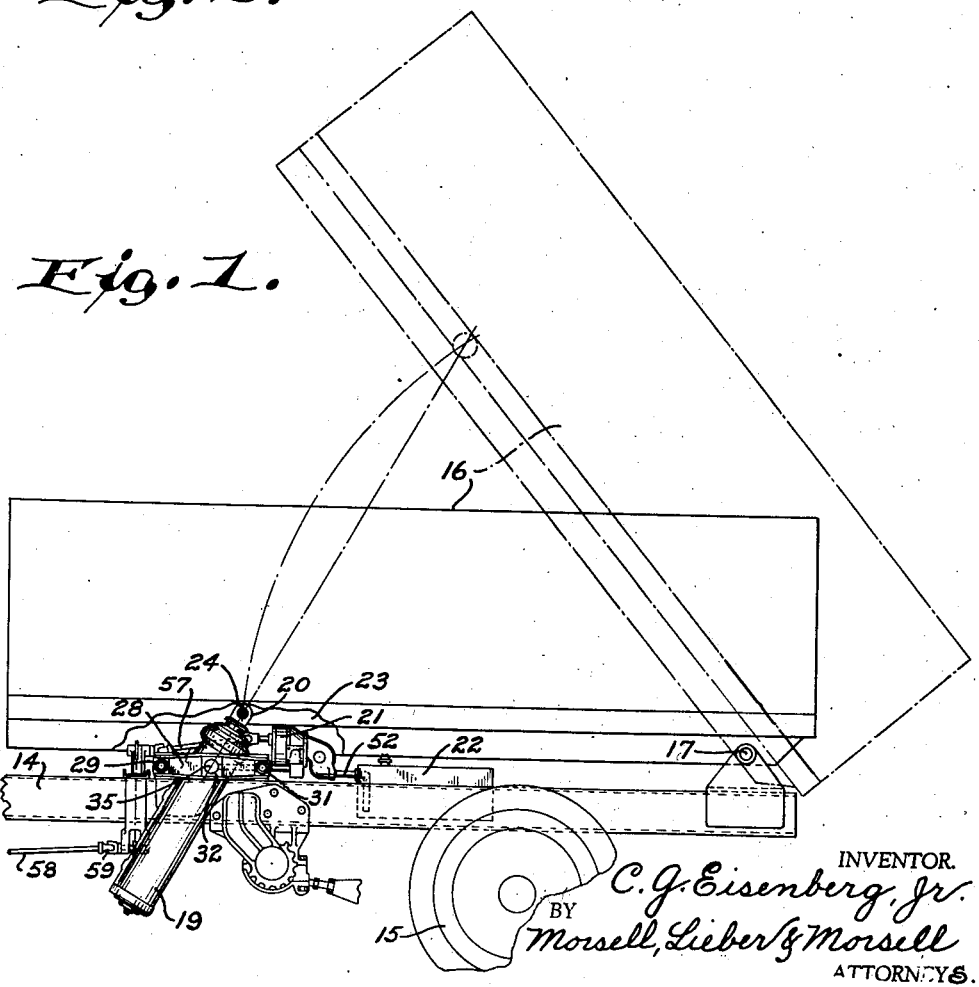
Fig. 1 is a somewhat diagrammatic side view of the rear portion of a dump truck showing the body in normal position in solid lines, and in extreme tilted position in dot-and-dash lines.

Referring to the drawings, and more especially to the typical assemblage of Figs. 1 and 2, the improved hoist and body system comprises in general a vehicle chassis 14 mounted upon rear propelling wheels 15; a dump body 16 tiltably mounted upon the rear portion of the chassis 14 by means of a transverse pivot 17 and extending forwardly over the chassis and laterally beyond the opposite sides thereof; and a hydraulic hoist assembly consisting of a U-shaped frame including transverse box beam 18, hoisting cylinders 19 pivotally suspended from the opposite ends of the beam 18, pistons 20 movable within the cylinders 19 and being operatively associated with the body 16, and a pump 21 operable by the vehicle propelling motor for supplying fluid such as oil under pressure to the hoist cylinders 19 from a supply reservoir 22.

The vehicle chassis 14 is ordinarily formed of elongated parallel side beams which are suitably braced and interconnected by transverse braces, and this chassis 14 provides a support for the driving mechanism for propelling the wheels 15 in a well known manner. The dump body 16 may be of any suitable size and shape, and when considerable carrying capacity is required, the body 16 usually projects sidewise considerably beyond the opposite sides of the chassis 14 as indicated in Fig. 2. The rear dump body pivot 17 is mounted in suitable bearings supported by the rear end portion of the chassis 14 as shown in Figs. 1 and 2, and the bottom of the body 16 is reenforced by longitudinal I-beams 23 to which the pistons 20 are attached by means of pivot pins 24.

The improved hoisting unit or assembly which is shown diagrammatically in Figs. 1 and 2, is illustrated more in detail in Figs. 3 to 9 inclusive. The single box beam 18 which constitutes the sole support for the hoist unit, has rectangularly polygonal cross-section as shown in Fig. 9, being formed of heavy sheet metal plates welded together, and having a relatively wide and flat lower face which rests directly upon the side beams of the chassis 14 beneath the front portion of the body 16. The medial portion of the box beam 18 has several heavy pipes 25 rigidly attached thereto and projecting therefrom as indicated in Fig. 9, and these pipes 25 provide a firm support to which the pump 21 is detachably secured in any convenient manner. The opposite ends of the beam 18 are provided with rigid projections 26 firmly secured to the beam 18 by welding or otherwise, and extending outwardly beyond the opposite sides of the chassis 14; and a set of parallel bearing bars 27, 28 is rigidly attached to and extends forwardly away from each of these rigid end projections 26 beyond each side of the chassis. The front ends of the bearing bars 27, 28 of each set, are firmly interconnected by means of braces 29; and the tops of the inner bars 27 and the adjacent ends of the braces 29 are additionally strengthened and connected to the top plate of the box beam 18 by means of reenforcing plates 30 as clearly shown in Fig. 5. The transverse beam 28 and the inner bars 27 obviously provide a rigid horizontally disposed U-shaped frame which rests directly upon the chassis 14, and the projections 26 extend outwardly beyond this frame. The outer bearing bars 28 are detachably secured to the outer ends 30 of the projections 26 and of the braces 29 by nuts 31 as illustrated in Figs. 3 and 5; and the medial portions of the bars 27, 28 of each set, are provided with aligned bearings 32 for swingably supporting the hoists. The inner bars 27 are also provided with depending plates 33 as shown in Figs. 7 and 8, which coact with the opposite sides of the adjacent chassis side beams in order to properly position the hoist supporting structure.

Each of the hoist cylinders 19 is provided with an integral hollow inner trunnion 34 and with an integral solid outer trunnion 35, these trunnions 34, 35 being aligned and located near the upper ends of the cylinders 19, and also being journaled in the bearings 32 so as to permit the cylinders to swing in order to accommodate the varying angularity of the axes of the pistons 20 during lifting and lowering of the body 16. The inner hollow trunnion 35 of each cylinder 19 is provided with a through passage, the end of which communicates with and provides a support for a fluid supply valve casing 36, and the opposite end of which is in open communication with a duct 37 formed in the cylinder wall and leading into the lower end of cylinder 19 as illustrated in Figs. 7 and 8. The pistons 20 of which there may be one or more in each cylinder, depending upon the lift required, are slidable upwardly within the cylinders 19 by liquid under pressure admitted through the ducts 37, and are movable downwardly to discharge the liquid from within the cylinders 19 through these ducts, by gravity acting upon the body 16 and pistons 20. It is to be understood that the type of hoist used may vary in accordance with the requirements, and that either a single piston or any desired number of telescopic pistons 20 may be utilized.

Each valve casing 36 has therein a spring pressed ball check valve 38 for permitting delivery of liquid under pressure to the corresponding cylinder port 37 while preventing escape of the fluid past this valve, and a second valve casing 39 is attached to each casing 36 by means of cap screws 40 as shown in Figs. 3, 5 and 7. The casings 39 are provided with ports 41 leading to the check valves 38, and with passages 42 extending around these check valves and communicating with the ducts 37 and with the ports 41 on the opposite sides of the valves 38. A rotary by-pass valve 43 is located in each of the passages 42, and these valves 43 are rigidly interconnected by means of a cross-shaft 44 to the medial portion of which a depending actuating lever 45 is attached. The port 41 and passage 42 of each valve casing 39, at the inlet sides of the corresponding valves 38, 43, are in open communication with one end of a flexible hose connection 46, and these hose connections 46 extend through enlarged slots or openings in the beam 18 and have their opposite ends fixedly attached to the pump 21 in communication with liquid distributing port 47. The port 47 connects directly with the pump discharge conduit 48 and has a by-pass duct 49 leading to a control valve 50 as shown in Figs. 3 and 4; and the suction conduit 51 of the pump 21 also communicates with the valve 50. The conduit 52 which communicates with the valve 50 between the duct 49 and the conduit 51, leads to the liquid supply reservoir 22, and the valve 50 is of the rotary balanced type.

The control valve 50 has a depending actuating lever 53 which is similar to the lever 45 for the by-pass valves 43, and the lower swinging ends of both of the levers 45, 53 are joined by a connection 54. The lever 45 is additionally provided with an actuating connection 55 which extends forwardly to an accessible actuating station, and the arrangement is obviously such that the valves 43, 50 are simultaneously manually operable to either deliver liquid under pressure to both cylinders 19, or to permit free exhaust of the actuating fluid to the reservoir 22. The pump 21 is of the well known gear type, and the driving shaft 56 of this pump is adapted to be driven from the vehicle propelling motor through countershafts 57, 58 and universal joints 59, in a well known manner. It is to be noted, that by mounting both hoists and the pump 21 directly upon the beam structure, these elements are always maintained in proper alignment regardless of possible distortion of the chassis 14, and this common mounting also permits most convenient assemblage of the entire hoisting system.

While the use of the valves 43 is desirable in order to prevent the body 16 from lowering accidentally due to breakage of the hose connections 46 or otherwise, these valves may be dispensed with, and an assemblage such as shown in Fig. 10 may be utilized. In this modified construction, the valve casings 36 are replaced by conduit fittings 60 which are permanently secured to the inner trunnions 34 and communicate with the cylinder ducts 37. The other valve casings 39 are replaced by elbow fittings 61 fixedly attached to pipes passing through the beam 18 and communicating with the port 47 in the pump casing, so that the port 47 is in constant open communication with the cylinder ducts 37. The elbow fittings 61 have spherical sockets with which spherical projections 62 formed on the fittings 60, coact, and the fittings 60, 61 of each set are connected by a coupling collar 63 which permits swinging or angular displacement of the alined fittings 60 with the cylinders 19 relative to the fittings 61 without danger of leakage.

During normal operation of the improved hoisting mechanism, and assuming the same to have been properly assembled and applied to the vehicle chassis 14, the overhanging hoists at the opposite side of the chassis 14 are simultaneously operable at the will of the operator, to raise the body 16 from the position shown in full lines in Fig. 1, to the position shown in dot-and-dash lines, and to lower the same. The pump 21 may be placed in operation by drivingly connecting the same to the vehicle propelling motor, and when the control valves 43, 50 are positioned as shown in Figs. 3, 5 and 6, the pump 21 is withdrawing liquid from the supply reservoir 22 through the conduit 52, past the valve 50 and through the suction conduit 51, and is delivering the liquid under pressure through the conduit 48, ports 47, hose connections 46, ports 41, and past the ball valves 38 into the cylinders 19. The fluid under pressure thus admitted to the cylinders 19, causes the pistons 20 therein to move upwardly and to thereby tilt the body 16. When the body 16 has been tilted to its extreme position, the pump 21 will function to by-pass the excess liquid in a well known manner, and the nonreturn valves 38 will prevent escape of fluid from within the cylinders 19 through the ducts 37. When it is desired to lower the body 16, it is only necessary for the operator to manipulate the connections 55, 54 so as to throw the valves 43, 50 to the opposite extreme position, the valve 50 being shown in such position in Fig. 4. When the valves are thus adjusted, the passages 42 are connected with the ports 41, thereby establishing free communication between the interiors of the cylinders 19 and the hose connections 46. The ports 47 are also connected to the conduit 52 through the ports 49 and the valve 50, thereby permitting free escape of liquid from the cylinders 19 to the reservoir 22. The weight of the body 16 and of the pistons 20 will then cause the former to lower until the beams 23 coact with the cross beam 18 which constitutes the support for the hoists. In this manner, the body 16 may be raised or lowered at will, and may be retained in elevated position by proper setting of the valves 43.

If an assemblage such as shown in Fig. 10 is used, the control of admission and discharge of fluid to and from the cylinders 19 is effected solely by manipulation of the valve 50. In either case, the cylinders 19 are free to swing about their trunnions 34, 35 so as to accommodate the displacement thereof during swinging of the body 16 about its pivot 17. The hose connections 46 will obviously accommodate such relative motion of parts, and the same is true of the swing connection shown in Fig. 10.

The specific formation of the hoist supports is an important feature of the present invention. Due to the relative great overall width of the body 16, the cylinders 19 are preferably located on opposite sides of the chassis 14, but because of the fact that the hoists exert a tremendous pressure against the body 16 during elevation of the latter, the cylinders 19 must be firmly mounted. The beam 18 is therefore formed with a rectangular box section and has a relatively wide lower face which directly engages the side beams of the chassis 14. The end projections 26 are rigidly attached to the beam 18 by welding, and the side bars 26, 27 are firmly secured to the projections 26 and have their forward ends rigidly interconnected by the members 29. The top plates 30 additionally reenforce and stiffen the assemblage, and the depending plates 33 secured to the bottom of the beam 18 and of the inner bars 27, serve to prevent possible shifting of the beam 18 relative to the chassis 14. The cylinders 19 are provided with upper trunnions 34, 35 which are journaled directly in the bearings 32 carried by the bars 27, 28, and by providing upper trunnions for the cylinders 19, obstruction to the driving mechanism of the vehicle is effectively prevented. The mounting of the pump 21 directly upon the hoist supporting beam 18, is also desirable since possible misalignment of parts is thereby avoided, and the entire assemblage can moreover be handled as a unit and applied to standard chassis frames.

From the foregoing detailed description, it will be apparent that my present invention provides improved fluid pressure actuated hoisting mechanism which is simple, compact and durable in construction, and which is moreover highly efficient in operation. The outside mounting for the trunnion supported dual hoists, is obviously adapted to rigidly interconnect and to effectively support the hoisting cylinders so as to meet even the severest requirements. While the improved twin hoist assemblage is especially adapted for cooperation with a dump body which is tiltably suspended from a vehicle chassis, this assemblage may also be utilized for other purposes, and the hoist mounting permits the assemblage to be quickly and effectively applied to any support such as a vehicle chassis. The improved distribution and control mechanism for delivering actuating fluid to and from the hoist cylinders, is not subject to leakage, and by utilizing the valves associated directly with the inner trunnions, the body 16 cannot drop in case the hose connections should break. The improved hoist mounting, while providing a firm support for maintaining the hoists in alignment, does not interfere with the driving mechanism for the rear wheels, or with any other structure forming a part of the vehicle, and this hoist support also provides a suitable stop for the body 16 when the latter is in lowered position. The hoist supporting beam also provides a convenient support for the pump, and the supporting assemblage may be readily constructed from heavy sheet metal rigidly interconnected by welding. The removable nuts associated with the end projections of the box beam and with the cross members 29, also facilitate assembly of the unit and removal of the hoists in case this becomes desirable.

It should be understood that it is not desired to limit the present invention to the exact details of construction or to the precise mode of operation, herein shown and described, for various modifications within the scope of the claims may occur to persons skilled in the art.

I claim:—

1. In combination, a vehicle chassis having opposite side beams, a dump body carried by said chassis, a U-shaped frame comprising a single transverse beam extending across and projecting outwardly beyond said chassis and laterally spaced inner bearing bars rigidly associated with said transverse beam and resting directly upon said chassis beams, outer bearing bars secured to the outer ends of said transverse beam and being spaced from said inner bars, and a hoist pivotally suspended between each set of said outer and inner bars directly adjacent to the corresponding chassis beam, said hoists being operatively associated with said body.

2. In combination, a vehicle chassis having opposite sides, a dump body suspended from said chassis, a horizontal U-shaped frame comprising a single transverse beam crossing and projecting outwardly beyond said chassis and laterally spaced inner bearing bars rigidly secured to said transverse beam and resting directly upon said chassis beams, outer bearing bars secured to the outer ends of said transverse beam and being spaced from said inner bars, means rigidly connecting the ends of each set of inner and outer bars remote from said transverse beam, and a hoist pivotally suspended between each set of said outer and inner bars directly adjacent to the corresponding chassis beam, said hoists being operatively associated with said body to move the same relative to said chassis.

3. In combination, a vehicle chassis having opposite parallel side beams, a dump body pivotally suspended from said chassis beams, a horizontal U-shaped rigid frame comprising a single transverse box beam resting upon and projecting outwardly beyond said chassis and laterally spaced inner bearing bars rigidly associated with said box beam and resting directly upon said chassis beams, outer bearing bars secured to the outer extremities of said transverse beam and being spaced from said inner bars, and a hoist pivotally suspended at its upper end between each set of said outer and inner bars directly adjacent the corresponding chassis beam, said hoists being operatively associated with said body to swing the same.

4. In combination, a vehicle chassis, a dump body carried by said chassis, a U-shaped rigid frame having inner side bars resting directly upon said chassis and a single cross-beam rigidly interconnecting the corresponding ends of said side bars and projecting outwardly beyond the chassis, outer bearing bars secured to the outer ends of said cross-beam and being spaced from said inner bars, and a hoist pivotally suspended between each set of said outer and inner bars directly adjacent the corresponding outer side of said chassis, said hoists being operatively associated with said body.

CHARLES G. EISENBERG, JR.